United States Patent
Fan et al.

(10) Patent No.: US 9,651,352 B2
(45) Date of Patent: May 16, 2017

(54) DEVICE AND METHOD FOR ROUNDNESS MEASUREMENT

(71) Applicant: 3DFAMILY TECHNOLOGY CO., LTD., New Taipei (TW)

(72) Inventors: Kuang-Chao Fan, Taipei (TW); Chih-Chin Hsu, Taipei (TW)

(73) Assignee: 3DFAMILY TECHNOLOGY CO., LTD., New Taipei (TW)

( * ) Notice: Subject to any disclaimer, the term of this patent is extended or adjusted under 35 U.S.C. 154(b) by 136 days.

(21) Appl. No.: 14/859,346

(22) Filed: Sep. 20, 2015

(65) Prior Publication Data
US 2016/0377406 A1 Dec. 29, 2016

(30) Foreign Application Priority Data
Jun. 24, 2015 (TW) ............................. 104120380 A

(51) Int. Cl.
*G01B 5/20* (2006.01)
(52) U.S. Cl.
CPC .................... *G01B 5/201* (2013.01)
(58) Field of Classification Search
CPC ................... G01B 5/20; G01B 5/201
USPC ................... 33/550, 551, 552, 783
See application file for complete search history.

(56) References Cited

U.S. PATENT DOCUMENTS

| | | | | |
|---|---|---|---|---|
| 3,942,253 A | * | 3/1976 | Gebel | G01B 5/201 33/551 |
| 4,456,516 A | | 6/1984 | Schaffner | |
| 4,903,413 A | * | 2/1990 | Bellwood | G01B 7/282 33/551 |
| 5,077,908 A | | 1/1992 | Moore | |
| 5,117,081 A | | 5/1992 | Bagdal | |
| 6,568,096 B1 | * | 5/2003 | Svitkin | B23Q 1/76 33/501.02 |
| 6,640,607 B2 | | 11/2003 | Abbe | |
| 6,690,991 B1 | * | 2/2004 | Kobayashi | B23Q 17/20 33/550 |
| 2002/0095808 A1 | * | 7/2002 | Takahashi | G01B 5/201 33/551 |
| 2010/0018298 A1 | * | 1/2010 | Kanematsu | G01B 5/0004 73/104 |

(Continued)

FOREIGN PATENT DOCUMENTS

| CN | 100491069 | 5/2009 |
|---|---|---|
| EP | 0744678 | 7/2001 |

*Primary Examiner* — G. Bradley Bennett
(74) *Attorney, Agent, or Firm* — Chieh-Mei Wang

(57) ABSTRACT

The invention discloses a method for roundness measurement, which includes the steps of, mounting and rotating an object on a rotary table; driving two measuring surfaces of two measurement units to respectively abut against two opposite sides of the object, wherein the two measurement units are disposed on two opposite sides of the rotary table and the two measuring surfaces are parallel to each other and perpendicular to a to surface of the rotary table; during rotation of the rotary table, measuring intermittently a shortest straight line distance between the two measuring surfaces and generating a variation data and after the rotary table completes a full-circle rotation, a processing unit receiving the variation data and generating measured data. The present invention also discloses a device for roundness measurement.

10 Claims, 5 Drawing Sheets

(56) References Cited

U.S. PATENT DOCUMENTS

2016/0161239 A1* 6/2016 Takanashi .............. G01B 5/201
33/551

* cited by examiner

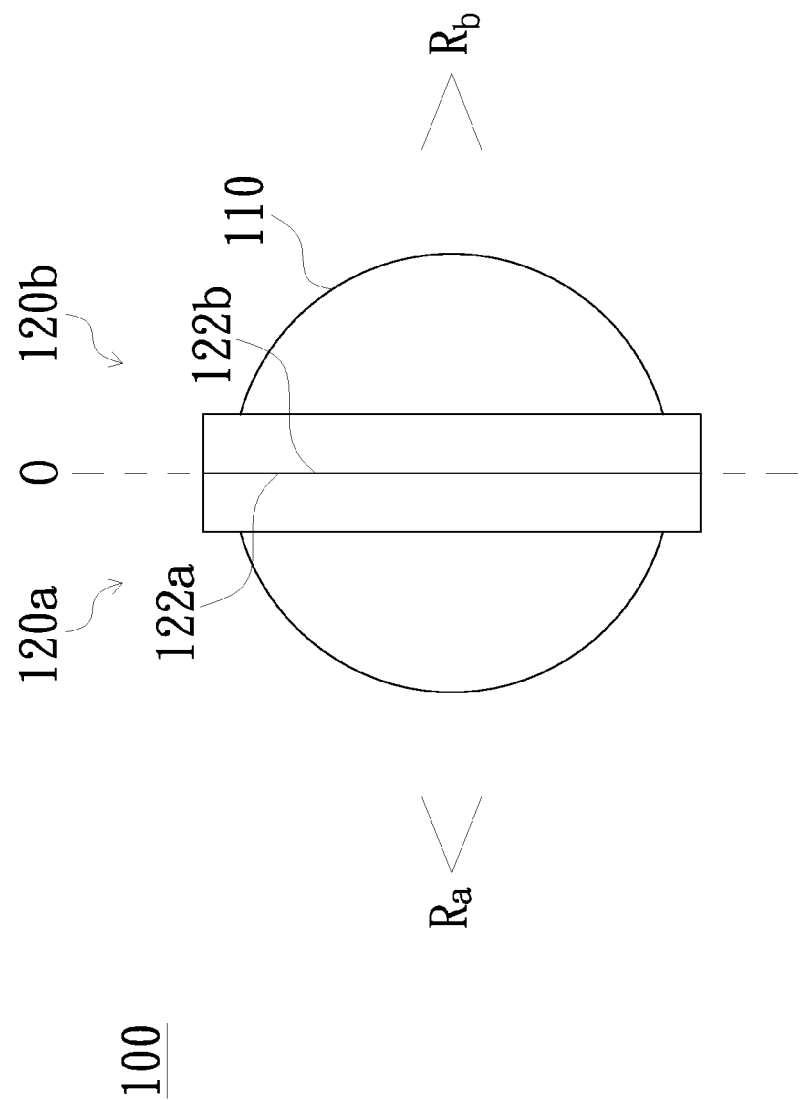

DEVICE AND METHOD FOR ROUNDNESS MEASUREMENT

FIELD OF THE INVENTION

The invention relates to a device and method for roundness measurement, and more particularly to a device and a method for object roundness, diameter and run-out error measurements.

BACKGROUND OF THE INVENTION

Devices for roundness measurement generally measure roundness by mounting a cylindrical object or any object with a circular cross-section onto a rotatable mount and contacting the surface of the object with measuring probes. The displacement of the measuring probes during rotation of the object is measured to obtain the contour of the circular cross-section of the object.

Conventional roundness measurement devices can be divided into two categories: a rotary sensor type with a fixed object and a rotary table type with fixed probes. A spindle is a required element for both types of device; consequently, spindle errors are present inevitably even with high-precision roundness measurement devices.

Presently, the most common method for roundness measurement is to clamp an object onto the center of a rotary table and assess the radial variation in object contour during rotation by measuring a single contact or noncontact displacement. However, errors caused by radial run-out of the rotating spindle and center positioning, of the object to the spindle are usually ignored.

More specifically, as current roundness measurement devices adopt only one probe, measurement of roundness is conducted under the assumption that no spindle run-out and object's centering error would occur when the object rotates for 360 degrees. Therefore, when an object is mounted onto a rotating table and the object is not aligned with spindle of the rotating table, only radius variation, but not the actual diameter and radius, of the object can be obtained.

SUMMARY OF THE INVENTION

The invention provides a device and method for roundness measurement, with the aim of solving the present technical limitations.

According to an embodiment of the invention a method for roundness measurement includes the steps of mounting and rotating an object on a rotary table; driving two measuring planar surfaces of two measurement units to respectively contact against two opposite sides of the object, wherein the two measurement units are disposed on two opposite sides of the rotation plate and the two measuring surfaces are parallel to each other and perpendicular to the top surface of the rotary table; during rotation of the rotary table, measuring intermittently the shortest line distance between the two measuring surfaces and generating a variation data; and after the rotary table completes a full-circle rotation, a processing unit receiving the variation data and generating measured data.

The device for roundness measurement of the embodiments of the present invention holds an object in place by abutting the object against two opposite measuring surfaces, which can prevent measurement errors resulted from displacement of points for measurement occurred during lateral movement of the object while rotating for roundness measurement. Meanwhile, errors resulted from run-out between the center of axis of the object and the spindle axis of the rotary table can be measured; thus, the roundness measurement device can accurately measure the average diameter of the object, the average radius of the object, and the radius variation of the object during rotation. Furthermore, the roundness measurement device can also determine the run-out distance between the center of axis of the object and spindle of the rotary table. On the other hand, the roundness measurement device of the embodiments of the present invention can accurately measure the roundness of the object for measuring even when the center of axis of the object and the spindle of the rotary table are not aligned with each other.

BRIEF DESCRIPTION OF THE DRAWINGS

The invention will become more readily apparent to those ordinarily skilled in the art after reviewing the following detailed description and accompanying drawings, in which:

FIGS. 3A-3C are schematic illustrations of the steps of a roundness measurement method of another embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
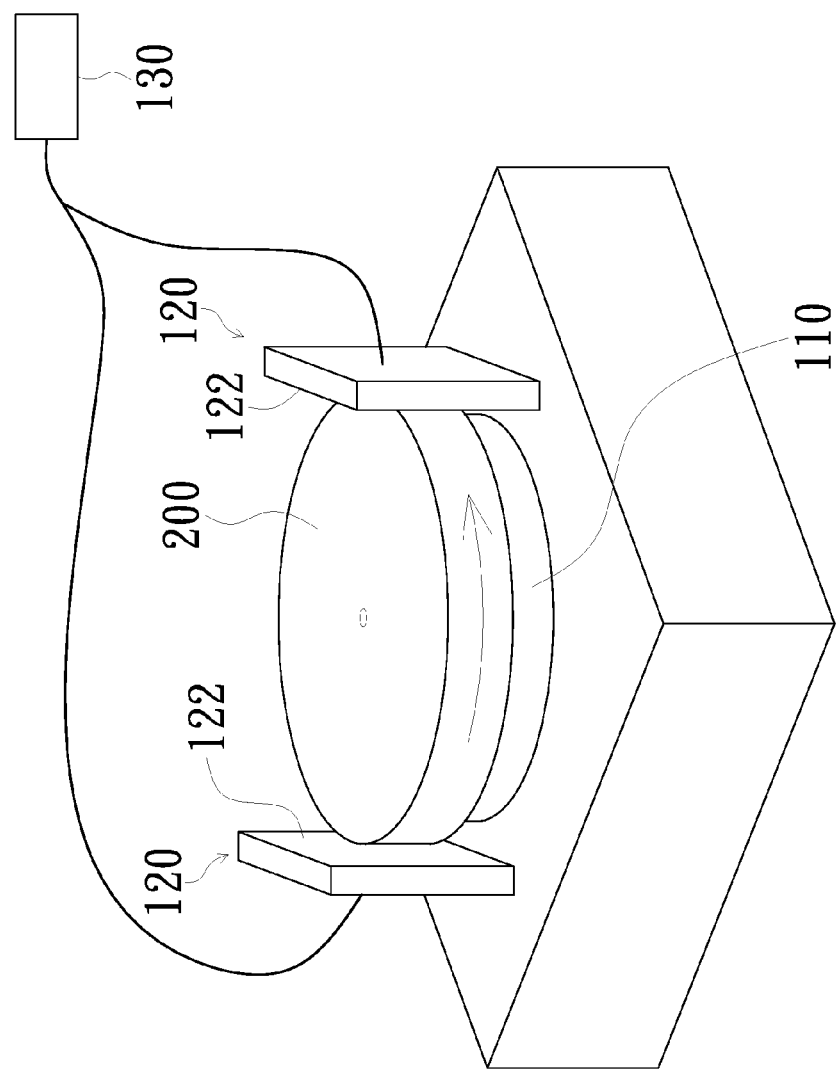
FIG. 1 is a three-dimensional view of a roundness measurement device of an embodiment of the present invention.

Referring to FIG. 1, which illustrates the three-dimensional view of a roundness measurement device of an embodiment of the present invention. As shown in FIG. 1 the roundness measurement device 100 includes a rotary table 110, two measurement units 120, and a processing unit 130.

The rotary table 110 is used for mounting and rotating an object 200; that is, the object 200 is mountable into the rotary table 110. In this embodiment, the object 200 ma be but not limited to a sphere or a cylinder.

Figure 2:
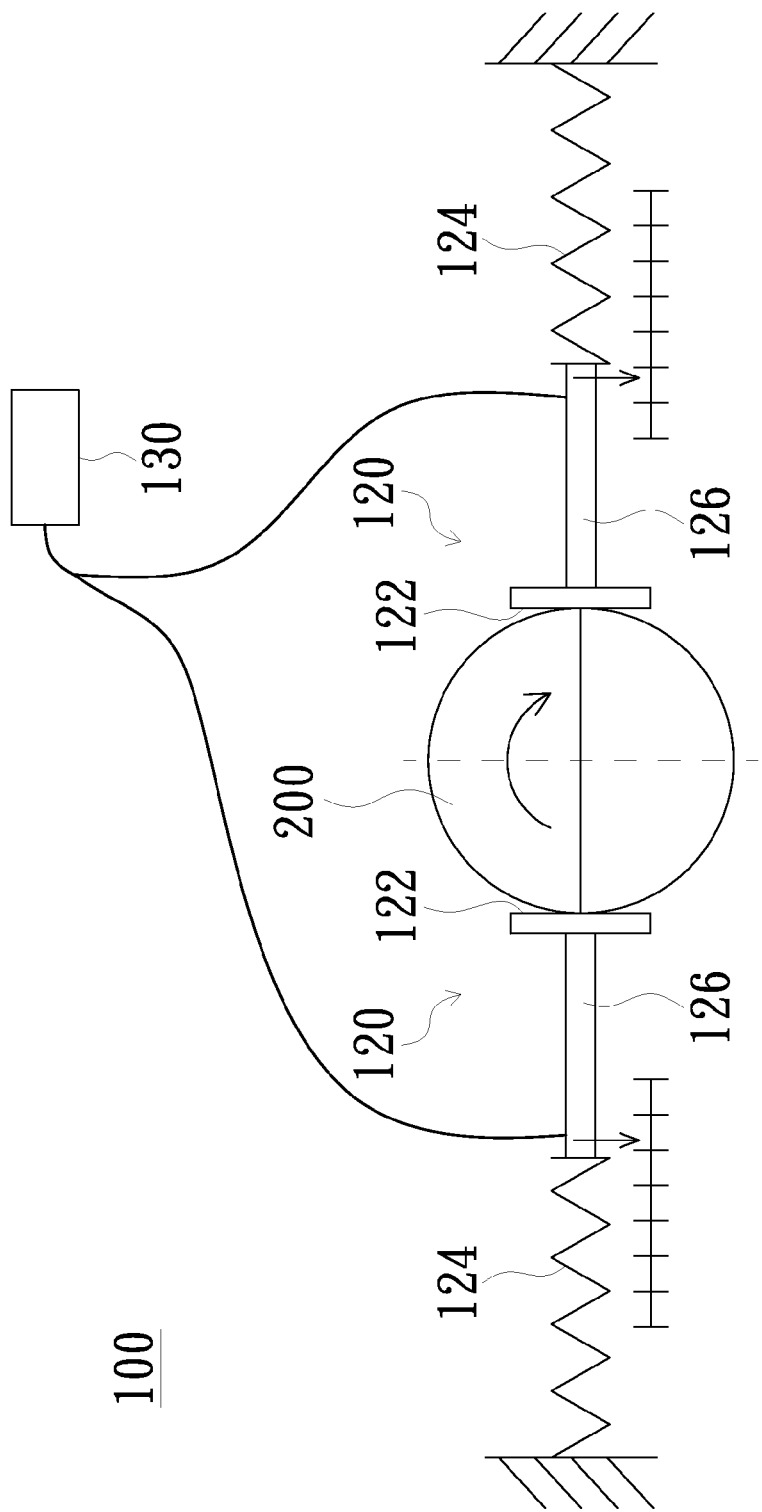
FIG. 2 is a top view of the roundness measurement device of FIG. 1.

The two measurement units 120 are disposed on two opposite sides of the rotary table 110, with each of the two measurement units 120 having a measuring surface 122. The two measuring surfaces 122 are parallel to each other and perpendicular to the top surface of the rotary table 110. The two measuring surfaces 122 can respectively abut against two opposite sides of the object 200. During the rotation of the rotary table 110, the two measurement units 120 intermittently measure the shortest line distance between the two measuring surfaces 122 and generate a variation data. As shown in FIG. 2, which illustrates the top view of the roundness measurement device of FIG. 1, each of the measurement units 120 may include an elastic element 124 connected to the corresponding one of the measuring surfaces 122. The measurement units 120 can elastically abut against the measuring surfaces 122 via the elastic element 124, so that the measuring surfaces 122 can stably abut against the object 200.

On the other hand, each of the measurement units 120 may include a measuring element 126 for measuring the displacement variation of the corresponding measuring surface 122 during intermittent rotation. The displacement variation may be the variation in displacement of the line between two opposite ends at which the object 200 contacts the two measuring surfaces 122. The displacement variation is, but not limited to, among the parameters for the variation data. In other words, when the rotary table 110 rotates and drives the rotation of the object 200, the measuring element 126 can measure the displacement variation of the object 200 during rotation. In this embodiment, the measuring element 126 may be a contact or noncontact measuring element; for example, the measuring element 126 may be, but not limited to, an optical measuring element.

The processing unit 130 is electrically coupled to the measurement units 120 for receiving the variation data and generating a measurement data after the rotary table 110 completes a full-circle rotation, therefore obtaining the roundness and other relevant information of the object 200. For example, the measurement data includes average diameter of the object 200, average radius of the object 200, radius variation of the object 200 during rotation, and the run-out distance between the center of axis of the object 200 and spindle of the rotary table 110 during rotation of the object 200. In this embodiment, the processing unit 130 may be, but not limited to, a computer.

It is noted that as roundness of the object 200 is measured by the measuring surfaces 122 in this embodiment, points of measurement of the object 200 can remain stably abutted against the measuring surfaces 122 when center of axis of the object 200 runs out of the spindle of the rotary table 110 in vertical or horizontal direction of FIG. 2; therefore, the measurement units 120 of this embodiment are capable of stably measuring the displacement variation at the points of measurement. Meanwhile, by measuring the points of measurement of the object 200 via the measuring surfaces 122, roundness measurement method of this embodiment enables roundness measurement of the object 200 without having to consider the displacement variation occurred during vertical movement of the points of measurement of the object 200.

Figure 3B:
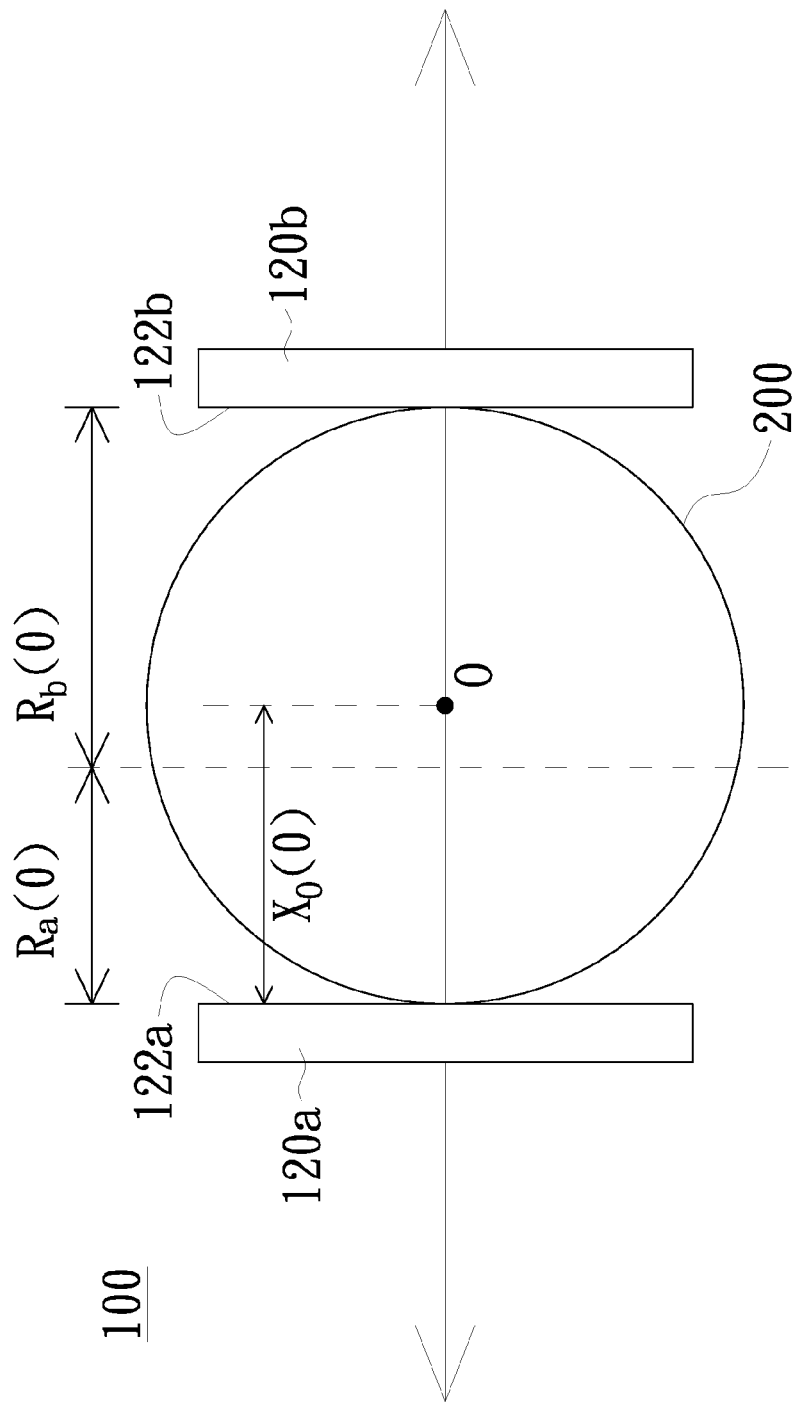
Figure 3C:
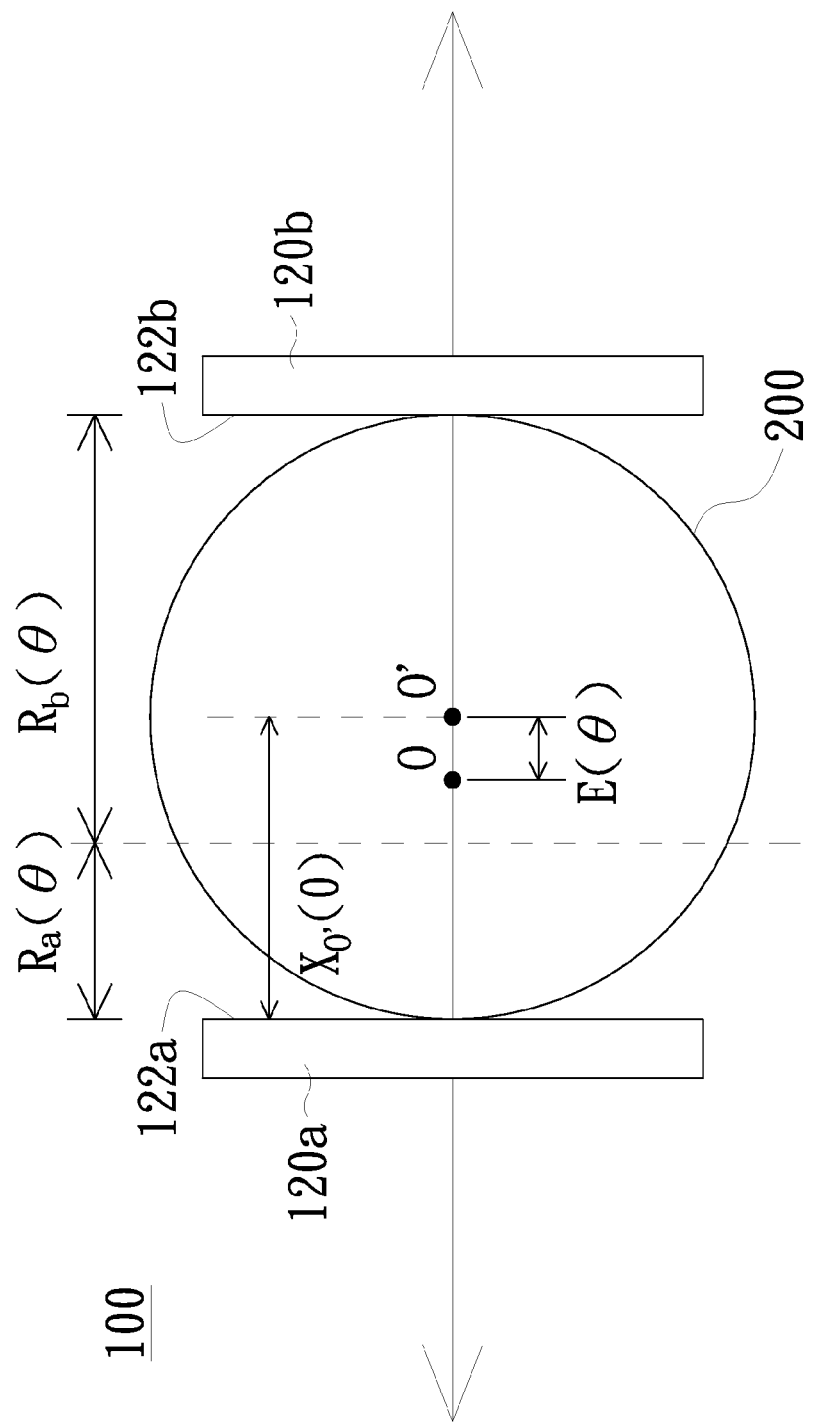

Referring now to FIGS. 3A-3C, which illustrates the steps of a roundness measurement method of another embodiment of the invention.

As shown in FIG. 3A, the two measurement units 120 may be defined as a first measurement unit 120a having a first measuring surface 122a and a second measurement unit 120b having a second measurement surface 122b. The first measuring surface 122a and the second measuring surface 122b are set closely alongside of each other and disposed at the spindle of the rotation plate 110 or an adjacent location, such that the shortest distance $R_a$ between the first measuring surface 122a and the contact point of the second measuring surface 122b and the shortest distance $R_b$ between the second measuring surface 122b and the contact point of the first measuring surface 122a are both set to 0. It is noted that contact points of the first measuring surface 122a and the second measuring surface 122b as illustrated in FIG. 3A need not locate at the spindle, but may shift to the right as shown in FIG. 3B. However, the invention is not limited thereto.

Thereafter, as shown in FIG. 3B, the first measuring surface 122a and the second measuring surface 122b are moved away from each other along a horizontal direction. The object 200 is then mounted onto the rotary table 110 close to the spindle, followed by moving both the first measuring surface 122a and the second measuring surface 122b backward along the horizontal direction until reaching the two opposite sides of the object 200 respectively. At present, angle of rotation θ of the object 200 is 0 as the rotary table 110 yet drives the rotation of the object 200. Meanwhile, read-out of the first measurement unit 120a is $R_a(0)$, which represents the distance between the point of measurement of the object 200 on the first measuring surface 122a and the point at which $R_a$ is set as 0; similarly, read-out of the second measurement unit 120b is $R_b(0)$, which represents the distance between the point of measurement of the object 200 on the second measuring surface 122b and the point at which $R_b$ is set as 0. The center O of the object 200 is located at Xo(0), Thereafter, the rotary table 110 begins rotation for roundness measurement; $R_a(\theta)$ of the first measurement unit 120a and $R_b(\theta)$ of the second measurement unit 120b are read at every θ degrees of rotation.

Thereafter, the $R_a(\theta)$ of the first measurement unit 120a and the $R_b(\theta)$ of the second measurement unit 120b are processed by the processing unit 130. Firstly, $R_a(0)$ is defaulted as 0, resulting in a calibrated read-out $R_a'(0)$ of the first measurement unit 120a when the object 200 is not rotating being $R_a(0)-R_a(0)=0$.

Likewise, the calibrated read-out $R_a'(\theta)$ of the first measurement unit 120a when the object 200 has rotated for θ degree is $R_a(\theta)-R_a(0)$; and the calibrated read-out $R_b'(\theta)$ of the second measurement unit 120b when the object 200 has rotated for 0 degree is $R_a(0)+R_a(0)+R_b(0)-R_b(\theta)$.

Consequently, average diameter $D_{avg}=SUM[R_a'(\theta)+R_b'(\theta)]/N$ of the object 200 is obtained (N represents the total number of points measured). That is average diameter $D_{avg}$ is obtained by measuring $R_a'(\theta)+R_b'(\theta)$ for N times during a full-circle rotation of the object 200 and averaging the resulting values. Therefore, average radius $R_{avg}$ of the object 200 is $D_{avg}/2$; that is, average radius of the object 200 equals to half of its average diameter.

At present, the center of the object 200 when the object 200 is not rotating (θ=0) is set as default, and θ=0 is defined along the direction from the center of the object 200 towards $R_a$. That is, radius variation, of the object 200 when the object 200 is not rotating (θ=0) is $\Delta r(\theta=0)=\Delta r(0)=0$; therefore, $R_a'(0)+R_b'(0)=D_{avg}+\Delta r(180)$ ($\Delta r(180)$ represents the radius variation at θ=180 degree when the object 200 is not rotating). Consequently, a radius variation of $\Delta r(180)=R_a'(0)+R_b'(0)-D_{avg}$ at θ=180 degree when the object 200 is not rotating is obtained. Meanwhile, location O of the center of the object 200 is $$X_O=R_b'(0)-\Delta r(180)-R_{avg} \quad \text{(Eq. 1)}.$$

As shown in FIG. 3C, the center of the object 200 may run-out a distance of E(θ) and reach location O' when the object 200 has rotated for θ degree and radial motion caused by the spindle run-out of the rotary table 110 and the centering error of the object 200 with respect to the spindle of the rotary table 110 have occurred. Under such circumstances:

Location O' of the spindle of the object 200 when having rotated for θ degree is $$X_{O'}(\theta)=X_O+E(\theta)=R_b'(\theta)-\Delta r(\theta)-R_{avg} \quad \text{(Eq. 2)}.$$

Meanwhile, calibrated $R_a'(\theta)$ of the first measurement 120a when the object 200 has rotated for θ degree may also be presented as $$R_a'(\theta)=R_a'(0)-E(\theta)+\Delta r(\theta) \quad \text{(Eq. 3)}.$$

Similarly; calibrated $R_b'(\theta)$ of the first measurement 120b when the object 200 has rotated for θ degree may also be presented as $$R_b'(\theta)=R_b'(0)+E(\theta)+\Delta r(180)-\Delta r(180) \quad \text{(Eq. 4)}.$$

Consequently, the distance of center run-out E(θ) of the object 200, radius variation $\Delta r(\theta)$ of the object 200 when having rotated for θ degree, and radius variation $\Delta r(\theta+180)$ of the object 200 when having rotated for $(\theta+180)$ are:

Eq. 1 gives $X_O = R_b'(0) - \Delta r(180) - R_{avg}$; and

Eq. 2 gives $X_O'(\theta) = X_O + E(\theta) = R_b'(\theta) - \Delta r(\theta) - R_{avg}$;

Therefore, $R_b'(0) - \Delta r(180) - R_{avg} + E(\theta) = R_b'(\theta) - \Delta r(\theta) - R_{avg}$.

The above equation then gives $$E(\theta) + \Delta r(\theta) = R_b'(\theta) - R_b'(0) + \Delta r(180) \quad \text{(Eq. 5)};$$

Likewise, Eq. 3 gives $$-E(\theta) + \Delta r(\theta) = R_a'(\theta) - R_a'(0) - R_a'(0) \quad \text{(Eq. 6)}.$$

Consequently, radius variation $\Delta r(\theta)$ of the object 200 when having rotated for θ degree can be obtained from combining Eq. 5 with Eq. 6.

Radius variation $\Delta r(\theta)$ of the object 200 when having rotated for θ degree can be presented as $$\Delta r(\theta) = [R_a'(\theta) + R_b'(\theta) - R_a'(0) - R_b'(0) + \Delta r(180)]/2 \quad \text{(Eq. 7)}$$

The distance of the center run-out $E(\theta)$ of the object 200 can be obtained by substituting Eq. 7 with Eq. 3, resulting in $$E(\theta) = R_a'(0) - R_a'(\theta) + \Delta r(\theta) \quad \text{(Eq. 8)}$$

Therefore, radius variation of the object 200 can be obtained from Eq. 7; and center run-out $E(\theta)$, or radial error, of the object 200 can be obtained from Eq. 8.

From the aforementioned embodiments of the present invention, the present invention has the following advantages. The roundness measurement device of the embodiments of the present invention holds an object in place by abutting: the object against two opposite measuring surfaces, which can prevent measurement errors resulted from displacement of points for measurement occurred during vertically lateral movement of the object while rotating for roundness measurement. Meanwhile, errors resulted from rim-out of the center of the object during rotation can be measured; thus, the roundness measurement device can accurately measure the average diameter of the object, the average radius of the object, and the radius variation of the object during rotation. Furthermore, the roundness measurement device can also determine the run-out distance of the object during rotation. On the other hand, the roundness measurement device of the embodiments of the present invention can accurately measure the roundness of the object for measuring even when the center of axis of the object and spindle of the rotary table are not aligned with each other.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for roundness measurement, comprising the steps of
   mounting and rotating an object on a rotary table:
   driving two measuring surfaces of two measurement units to respectively abut against two opposite sides of the object, wherein the two measurement units are disposed on two opposite sides of the object and the two measuring surfaces are parallel to each other and perpendicular to the top surface of the rotary table;
   during rotation of the rotary table, measuring intermittently a shortest straight line distance between the two measuring surfaces and generating a variation data and
   after the rotary table completes a full-circle rotation, a processing unit receiving the variation data and generating measured data.

2. The method for roundness measurement according to claim 1, wherein the measured data comprises average diameter of the object, average radius of the object, radius variation of the object during rotation and center run-out of the object during rotation.

3. The method for roundness measurement according to claim 1, wherein the object is a sphere or a cylinder.

4. The method for roundness measurement according to claim 1, wherein each of the measurement units comprises an elastic element, correspondingly connected to the measuring surface for elastically abutting the measuring surface.

5. The method for roundness measurement according to claim 1, wherein each of the measurement units comprises a measuring element, for measuring a displacement variation of the corresponding measuring surface during intermittent rotation, and the displacement variation is along the fine between two opposite ends at which the object contacts the two measuring surfaces.

6. A device for roundness measurement, comprising:
   a rotary table, for mounting and rotating an object
   two measurement units, disposed on two opposite sides of the rotary table, each of the two measurement units comprising a measuring surface, the two measuring surfaces are parallel to each other and perpendicular to a top surface of the rotary table for abutting against two opposite sides of the object, wherein during rotation of the rotary table, the two measurement units intermittently measure a shortest straight line distance between the two measuring surfaces and generate a variation data; and
   a processing unit, electrically coupled to the measurement units for receiving the variation data and generating measured data after the rotation plate completes a full-circle rotation.

7. The device for roundness measurement according to claim 6, wherein the measured data comprises average diameter of the object, average radius of the object, radius variation of the object during rotation and center run-out of the object during rotation.

8. The device for roundness measurement according to claim 6, wherein the object is a sphere or a cylinder.

9. The device for roundness measurement according to claim 6, wherein each of the measurement units comprises an elastic element, correspondingly connected to the measuring surface for elastically abutting the measuring surface.

10. The device for roundness measurement according to claim 6, wherein each of the measurement units comprises a measuring element, for measuring a displacement variation of the corresponding measuring surface during intermittent rotation, and the displacement variation is along the line between two opposite ends at which the object contacts the two measuring surfaces.

* * * * *